US009949137B2

(12) United States Patent
Smith et al.

(10) Patent No.: US 9,949,137 B2
(45) Date of Patent: Apr. 17, 2018

(54) WI-FI BASED LOCATION AVAILABILITY FOR SPARSE SIGNAL LOCATIONS

(71) Applicant: APPLE INC., Cupertino, CA (US)

(72) Inventors: Brian S. Smith, Campbell, CA (US); David B. Millman, Mountain View, CA (US); Rob Brumley, Menlo Park, CA (US); Rob Mayor, Cupertino, CA (US); Ben Detwiler, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/216,495

(22) Filed: Jul. 21, 2016

(65) Prior Publication Data

US 2017/0026850 A1   Jan. 26, 2017

Related U.S. Application Data

(60) Provisional application No. 62/196,895, filed on Jul. 24, 2015.

(51) Int. Cl.
| | |
|---|---|
| *H04W 24/00* | (2009.01) |
| *H04W 16/18* | (2009.01) |
| *H04W 4/16* | (2009.01) |
| *H04W 4/02* | (2018.01) |
| *H04W 84/12* | (2009.01) |
| *H04W 64/00* | (2009.01) |

(52) U.S. Cl.
CPC .......... *H04W 16/18* (2013.01); *H04W 4/023* (2013.01); *H04W 4/025* (2013.01); *H04W 4/16* (2013.01); *H04W 64/00* (2013.01); *H04W 84/12* (2013.01)

(58) Field of Classification Search
CPC ....... H04W 4/02; H04W 4/025; H04W 4/027; H04W 4/028; H04W 4/04; H04W 64/00; H04W 64/04
USPC .................... 455/456.1, 456.2, 456.5, 456.6
See application file for complete search history.

(56) References Cited

U.S. PATENT DOCUMENTS

| | | | |
|---|---|---|---|
| 2012/0190386 A1* | 7/2012 | Anderson | G01C 15/04 455/456.3 |
| 2014/0141803 A1* | 5/2014 | Marti | H04W 4/043 455/456.2 |
| 2015/0172863 A1* | 6/2015 | Brachet | G01S 5/0236 455/456.1 |
| 2016/0323704 A1* | 11/2016 | Brachet | G01S 5/0236 |

* cited by examiner

*Primary Examiner* — Temica M Beamer
(74) *Attorney, Agent, or Firm* — Invoke

(57) ABSTRACT

In some implementations, a server device can improve Wi-Fi based location availability for sparse signal locations by augmenting Wi-Fi access point location data with additional Wi-Fi scan data that was collected near the sparse signal locations. The server can receive Wi-Fi access point scans from client devices, determine the locations of the Wi-Fi access points, and generate Wi-Fi access point tiles that include data describing the locations of access points in the geographic areas corresponding to the Wi-Fi access point tiles. After the tiles are generated, the server device can augment the access point tiles by inserting additional Wi-Fi access point scan information into the access point tiles near identified sparse signal locations. The server device can deliver the augmented access point tile data to a client device. The client device can determine the current location of the client device based on the augmented access point tile data.

18 Claims, 9 Drawing Sheets

WI-FI BASED LOCATION AVAILABILITY FOR SPARSE SIGNAL LOCATIONS

CROSS-REFERENCE TO RELATED APPLICATION

This application claims priority to U.S. Provisional Application Ser. No. 62/196,895, filed Jul. 24, 2015, which is hereby incorporated by reference herein in its entirety.

TECHNICAL FIELD

The disclosure generally relates to location determination systems.

BACKGROUND

Many modern mobile computing devices include location determination systems that can determine the current location of the computing device based on signals received from various sources. For example, a mobile device can receive signals from a global navigational satellite and can determine the current location of the mobile device based on the satellite signals. A mobile device can receive signals from cellular telephone towers and can determine the location of the mobile device based on the cellular tower signals. A mobile device can receive signals from Wi-Fi access points (AP) and can determine the location of the mobile device based on the Wi-Fi access point signals. To determine the current location of the mobile device, each of these location technologies requires that the mobile device has data that identifies the location of the signal source (e.g., satellite, cell tower, Wi-Fi access point, etc.) so that the mobile device can perform the required location calculation.

SUMMARY

In some implementations, a server device can improve Wi-Fi based location availability for sparse signal locations by augmenting Wi-Fi access point location data with additional Wi-Fi scan data that was collected near the sparse signal locations. The server can receive Wi-Fi access point scans from client devices, determine the locations of the Wi-Fi access points, and generate Wi-Fi access point tiles that include data describing the locations of access points in the geographic areas corresponding to the Wi-Fi access point tiles. After the tiles are generated, the server device can augment the access point tiles by inserting additional Wi-Fi access point scan information into the access point tiles near identified sparse signal locations. The server device can deliver the augmented access point tile data to a client device. The client device can determine the current location of the client device based on the augmented access point tile data.

Particular implementations provide at least the following advantages: additional Wi-Fi location data can be provided to client devices for locations where Wi-Fi signal availability is sparse or infrequently reported thereby improving the chance that the client device will be able to determine its current location based on the limited Wi-Fi signal data when at the sparse signal location; the amount of Wi-Fi access point data delivered to a client device can be minimized while improving the ability of the client device to determine a current location of the client device when located at a sparse signal location.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
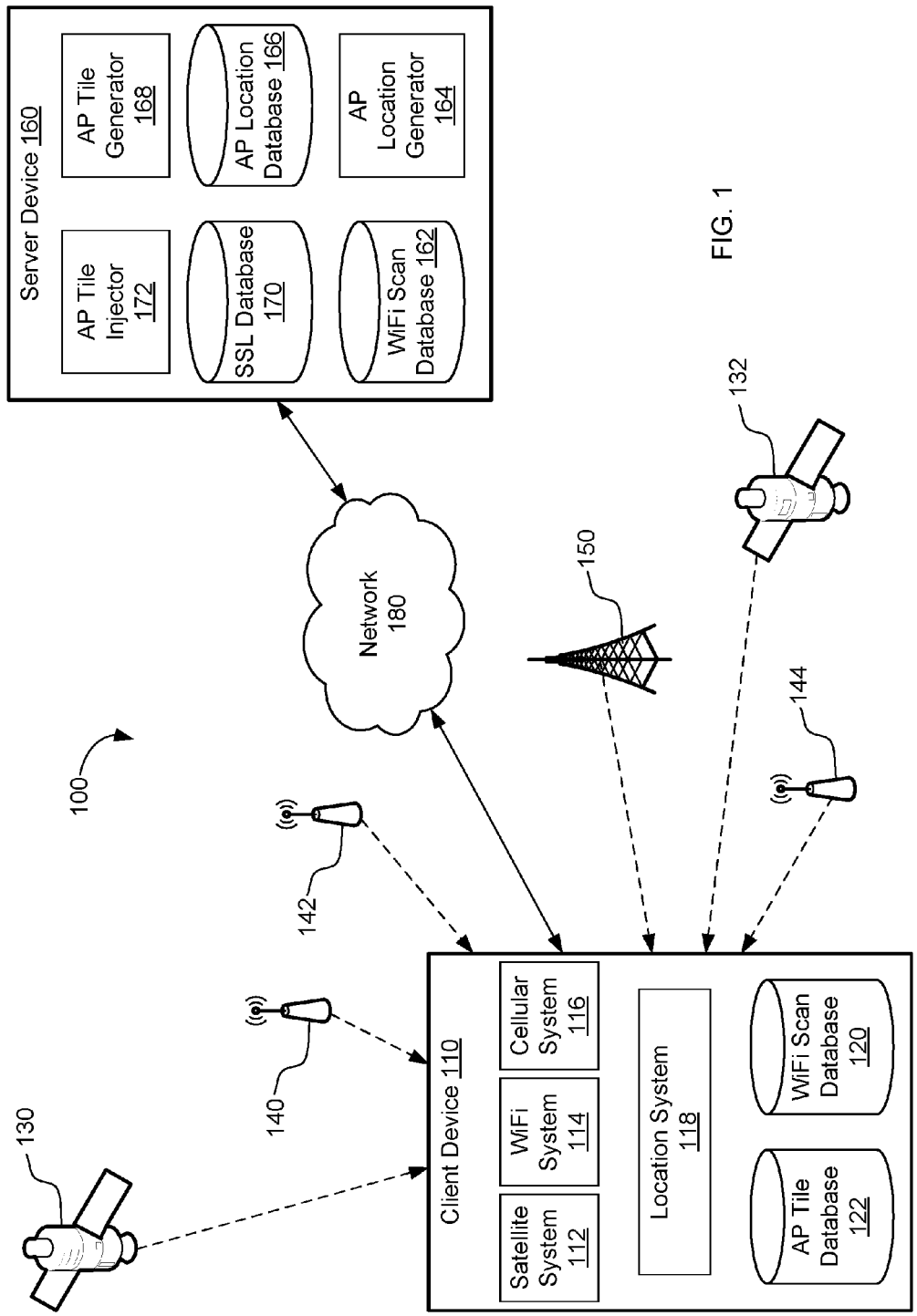
FIG. 1 illustrates an example system for improving Wi-Fi based location availability for sparse signal locations.

FIG. 1 illustrates an example system 100 for improving Wi-Fi based location availability for sparse signal locations. In some implementations, system 100 can include client device 110. For example, client device 110 can be a mobile device, such as a laptop computer, smartphone, tablet computer, smartwatch, etc. Client device 110 can be configured with various subsystems capable of receiving wireless signals from various signal sources. For example, satellite system 112 can receive wireless signals from global navigational satellites 130 and/or 132. Wi-Fi system 114 can receive wireless signals from Wi-Fi access points 140-144. Cellular system 116 can receive wireless signals from cellular telephone tower 150.

In some implementations, the received wireless signals can be processed by location system 118 to determine the current location of client device 110. For example, using well-known mechanisms (e.g., trilateration), location system 118 can use the satellite data (e.g., signal location, signal transmission timestamp, etc.) in the satellite signals received by satellite system 112 to determine the current location of client device 110.

Similarly, location system 118 can use Wi-Fi and/or cellular signal data received by Wi-Fi system 114 and/or cellular system 116 to determine the current location of client device 110. For example, the Wi-Fi and/or cellular signals can be encoded with data that includes an identifier for each Wi-Fi access point (AP) 140-144 and/or cellular tower 150. The Wi-Fi and/or cellular signal data can include a timestamp indicating when the signal was transmitted by a Wi-Fi access point or cellular telephone tower. Client device 110 can be configured with known locations of Wi-Fi access points and/or cellular telephone towers (e.g., in access point tile database 122). Location system 118 can compare the access point and/or cell tower identifiers to the known access point and/or cell tower location data stored on client device 110 to determine the location of the source of each Wi-Fi and/or cellular signal.

Location system 118 can determine the distance that client device 110 is from a signal source by calculating the time-of-flight (e.g., time of arrival, travel time) for each signal and calculating the distance based on the time-of-flight. For example, the time-of-flight can be calculated by determining the difference between time of receipt and time of transmission of the corresponding signal. Client device 110 can use the location of multiple signal sources and the calculated distance from the signal sources to determine the current location of client device 110 using well known mechanisms (e.g., trilateration). Alternatively, client device 110 can use well-known Wi-Fi fingerprinting techniques to determine the current location of client device 110 based on Wi-Fi access point identifiers and the signal strength of each received signal.

In some implementations, client device 110 can send Wi-Fi access point scan data to server device 160. For example, client device 110 (e.g., multiple client devices 110) can scan for Wi-Fi access point signals. When Wi-Fi system 114 of client device 110 receives Wi-Fi signals from access point 140, for example, Wi-Fi system 114 can send the Wi-Fi signal data to location system 118. For example, the Wi-Fi signal data can include data extracted from the Wi-Fi signal, such as an identifier for access point 140 and a timestamp indicating when the signal was transmitted by access point 140. The Wi-Fi signal data can include data generated by Wi-Fi system 114 based on the received signal, such as a received signal strength, a timestamp indicating when the signal was received by Wi-Fi system 114, a channel upon which the signal was broadcast, and/or a distance between client device 110 and a Wi-Fi signal source as calculated based on the transmit and receive timestamps.

Upon receipt of the Wi-Fi signal data, location system 118 can associate (e.g., tag) the Wi-Fi signal data with the current location of client device 110 (e.g., as generated based on satellite, cellular, and/or Wi-Fi signals, described above) and store the location tagged Wi-Fi signal data in Wi-Fi scan database 120. For example, Wi-Fi scan database 120 can include access point scan records that associate access point identifiers with corresponding signal strength, transmission timestamps, receipt timestamps, and device location data. In some implementations, location system 118 can store the calculated distance between client device 110 and the transmitting Wi-Fi access point in the Wi-Fi access point scan record stored in Wi-Fi scan database 120. In some implementations, client device 110 can generate and store multiple records for a single Wi-Fi access point in Wi-Fi scan database 120. For example, over time, client device 110 can generate multiple access point scan records containing access point data generated for a single access point at different times and/or different locations.

In some implementations, client device 110 can send the Wi-Fi access point scan records in Wi-Fi scan database 120 to server device 160. For example, client device 110 can periodically send the Wi-Fi access point records to server device 160. In some implementations, client device 110 can initiate sending the Wi-Fi access point records based on a network connection state of client device 110. For example, when client device 110 is connected to network 180 using a cellular data connection, client device 110 can be configured to wait until client device 110 establishes a Wi-Fi connection to network 180 before sending the access point scan records to server device 160 so that the user of client device 110 will not incur cellular data charges when client device 110 transmits the access point scan records to server device 160.

In some implementations, server device 160 can receive Wi-Fi access point scan records from client device 110. For example, server device can store the Wi-Fi access point scan records in Wi-Fi scan database 162. In some implementations, server device 160 can determine access point locations based on access point scan data received from client devices. For example, server device 160 can receive access point scan data from multiple client devices. Server device 160 can store the raw (e.g., unprocessed, unfiltered, etc.) access point scan data in Wi-Fi scan database 162. For example, server 160 can store multiple records including scan data for access points received from different client devices 110. Access point location generator 164 can analyze the access point scan data in Wi-Fi scan database 162 to estimate the locations of each access point in the Wi-Fi scan database. For example, three different client devices at different locations can report access point scan data for access point 140. Based on the reported access point scan data, server device 160 can determine the locations of client devices 110 when the access point signals were received by the client devices. Server device 160 can calculate how far away (e.g., distance) from access point 140 each client device was at the time the signals were received. Based on the client device location information and the distance determination, server device 160 can perform a trilateration calculation to estimate the location of access point 140.

Once the location for an access point in Wi-Fi scan database 162 is determined, the access point location information can be stored in association with the access point identifier in access point location database 166. In some implementations, other access point data can be stored in association with an access point identifier in access point location database 166. For example, a detected frequency metric can be stored for with the access point location data in access point location database 166. The detected frequency metric can represent how often during a time period the corresponding access point was detected by client devices. The frequency metric can be calculated based on the number of access point scan records were reported by client devices for the access point. Other stored access point data can include a last detected timestamp that indicates the date/time when the corresponding access point was last detected by a reporting client.

In some implementations, access point tile generator 168 can generate access point tiles based on the access point location data stored in access point location database 166. For example, access point tiles can correspond to a geographic area (e.g., a 1 mile×1 mile square) and can include data identifying locations of access points within the tile area. Access point tile generator 168 can subdivide access point data corresponding to a larger geographic area (e.g., the world, a country, a region, etc.) into tiles that are smaller, more easily delivered access point data units.

In some implementations, the access point tiles can be delivered to a client device 110 as needed when the client device 110 changes locations. For example, if client device 110 is normally located within the San Francisco bay area, server 160 can deliver access point tiles to client device 110 that correspond to the San Francisco bay area. If client device 110 moves to Las Vegas, server 160 can deliver access point tiles corresponding to the Las Vegas area.

Alternatively, each access point tile can be associated with an identifying location (e.g., a location corresponding to a corner of the tile). Client device 110 can request tiles from server device 160 corresponding to the current location of client device 110. Server device 160 can identify which access point tiles are within a threshold distance of the current location of client device 110 and deliver the identified access point tiles to client device 110. To free storage space on client device 110, access point tiles that do not correspond to locations near client device 110 (e.g. not within the threshold distance) can be removed from storage (e.g., AP tile database 122) on client device 110. Thus, the access point tiles stored on client device 110 can change when the current location of client device 110 changes.

Figure 2:
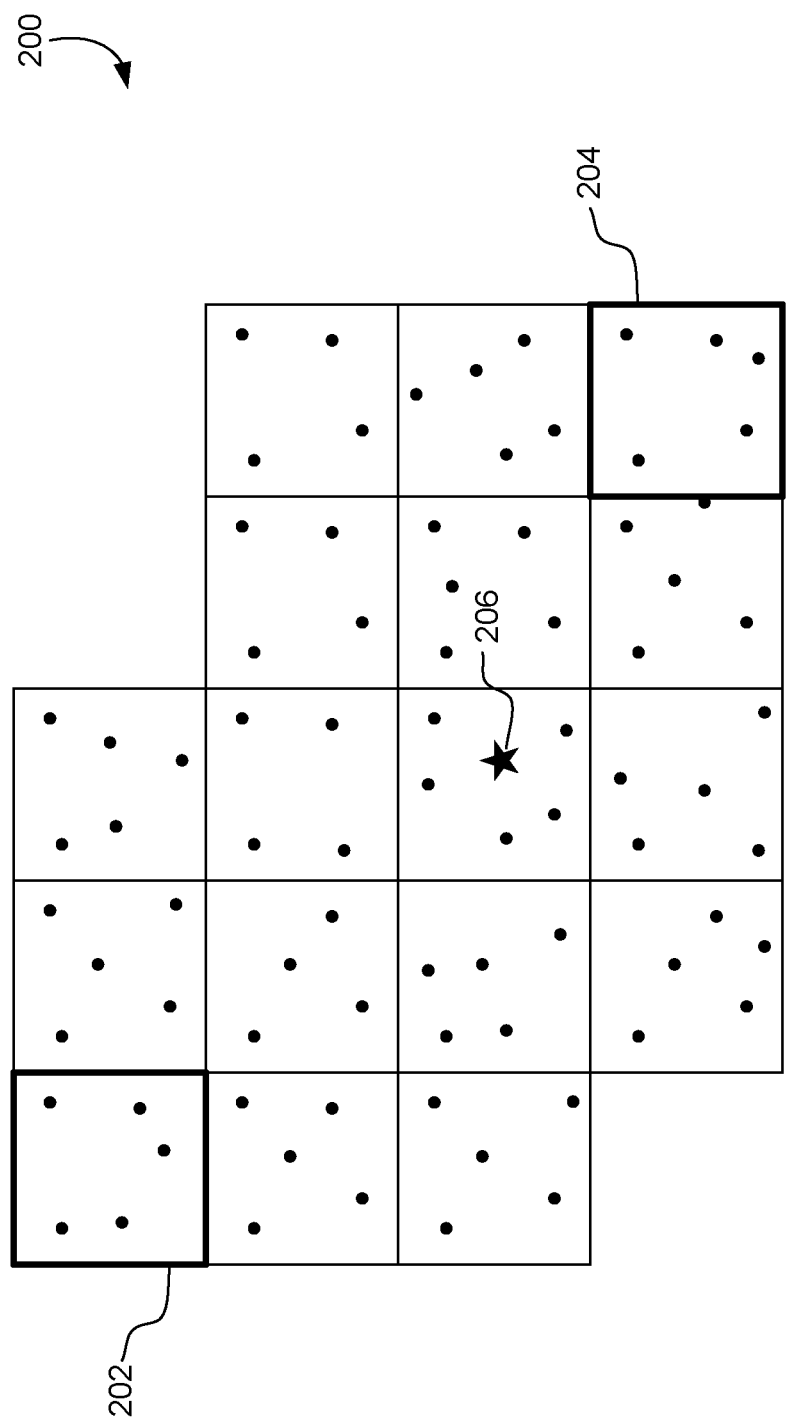
FIG. 2 illustrates example geographic area that is subdivided into multiple access point tiles.

FIG. 2 illustrates example geographic area 200 that is subdivided into multiple access point tiles. For example, geographic area 200 can represent a geographic region, metropolitan area, or other large area. Geographic area 200 can include a large amount of Wi-Fi access point data, for example. To make the Wi-Fi access point data more manageable, the Wi-Fi access point data corresponding to geographic area 200 can be subdivided into access point tiles that cover geographic area 200. For example, geographic area can include tiles 202 and/or 204. Each access point tile can include data that identifies access point locations within the geographic area covered by the tile. The access point locations in tiles 202 and 204 (and throughout geographic area 200) are represented by black dots. The access point location data corresponding to each geographic tile (e.g., tile 202 and/or 204) can be stored and transmitted to client devices as an independent data unit (e.g., a collection of access point location data).

In some implementations, access point tile generator 168 can filter the access point location data for each access point tile. For example, access point tile generator 168 can filter the access point location data in access point location database 166 so that the access point location data associated with each tile represents the most significant and/or most useful access point locations. Access point tile generator 168 can, for example, filter out access points that are infrequently detected by client devices. Access point tile generator 168 can filter out access points that have not been detected within a threshold period of time (e.g., a day, a week, etc.). Access point tile generator 168 can filter out access points that broadcast signals on infrequently used channels. Access point tile generator 168 can filter access point location data based on the access point's location within the access point tile. For example, access point tile generator can include (or exclude) access point location data in the access point tile to ensure complete coverage of the geographic area corresponding to the access point tile.

In some implementations, access point tiles (or the access point data therein) can be sent to client devices as needed. For example, geographic area 200 can include an area corresponding to the movements of client device 110. For example, geographic area 200 can correspond to locations where client device 110 is currently located or where the client device 110 has recently been located, for example. As client device 110 moves, server 160 can deliver additional access point tiles to client device 110 so that client device 110 has access point tiles proximate to (e.g., within 10 miles, within 100 miles) the current location of client device 110. Client device 110 can receive the access point tiles and store the tiles in Wi-Fi tile database 122.

In some implementations, client device 110 can use the access point location data stored in access point tile database 122 to determine the current location 206 of client device 110. For example, when client device 110 receives Wi-Fi access point signals, client device 110 can compare the access point identifiers in the signals to the access point tile database to determine the location of the access points that transmitted the signals. Client device 110 can calculate the distance that client device 110 is from each access point based on the time-of-flight for each signal, as described above. Client device 110 can perform trilateration calculations based on the access point locations and distances to estimate the current location 206 of client device 110. Client device 110 can perform Wi-Fi receive signal strength fingerprinting to estimate the current location 206 of client device 110.

Figure 3:
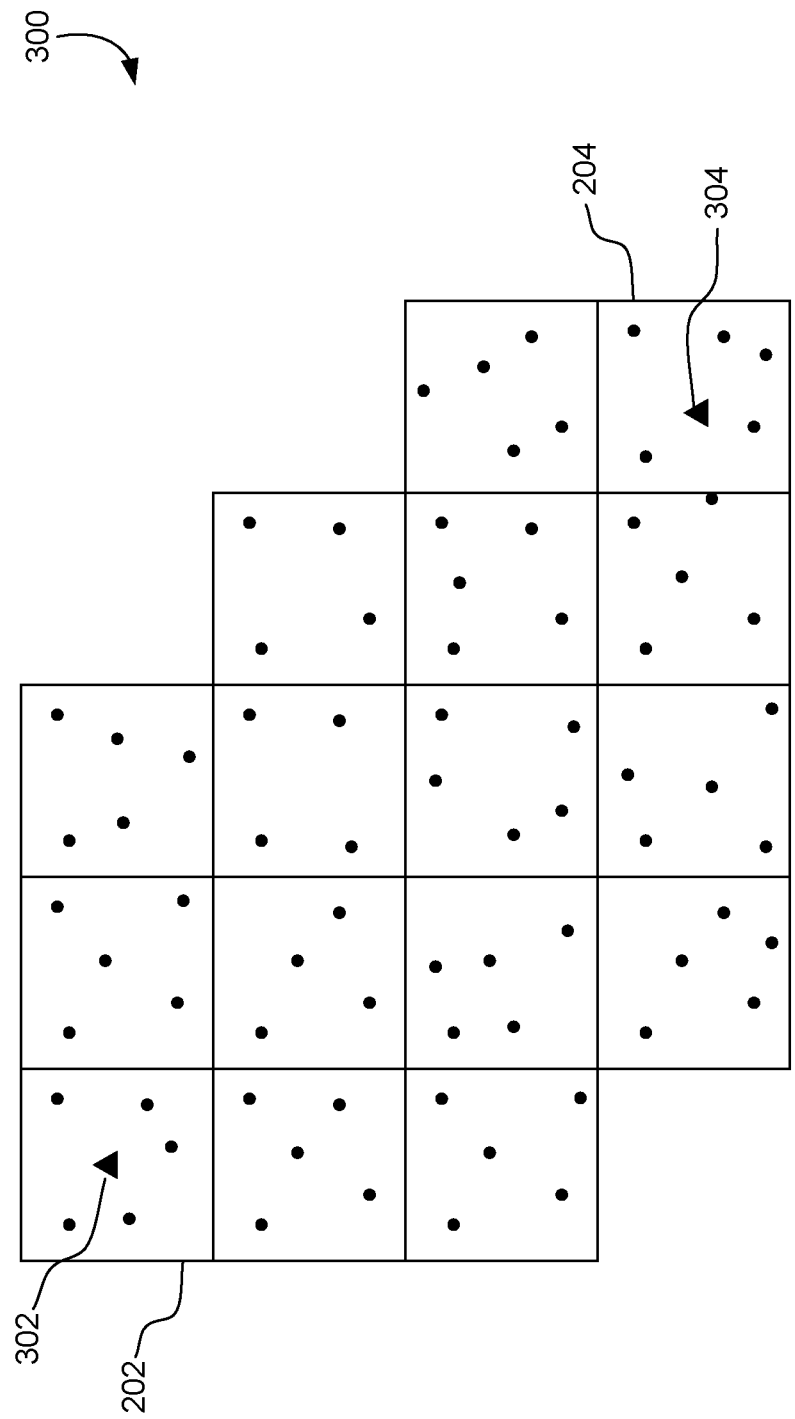
FIG. 3 illustrates an example geographic area having sparse signal locations.

FIG. 3 illustrates an example geographic area 300 having sparse signal locations. For example, geographic area 300 can correspond to geographic area 200 of FIG. 2. As described above, access point tile generator 168 can filter out access point location data when generating access point tiles to reduce the amount of data transmitted and stored in each access point tile. However, when filtering access point location data, access point tile generator 168 may filter out some access point location data that may be needed by client device 110 to estimate a current location of client device 110. For example, client device 110 may be located at sparse signal location 302 or 304 where client device 110 has limited or no access to satellite and/or cellular signals. In these sparse signal locations, client device 110 may need to rely upon Wi-Fi access point signals to determine the location of client device 110. If the previously received and stored access point tiles do not include access point location data for Wi-Fi access points detected at the sparse signal location, then client device 110 may not be able to estimate the current location of client device 110.

A sparse signal location can be a location where Wi-Fi access point signals are contained to a small area (e.g., inside a building) and are therefore not frequently detected and reported. A sparse signal location can be a location where Wi-Fi access point signals cannot be consistently geo-tagged because the location (e.g., indoors, underground, etc.) does not allow for receiving the signals (e.g., satellite signals, cellular signals, etc.) necessary for determining the current location of client device 110. Access points that transmit signals that are infrequently geo-tagged may be filtered out when generating access point tiles. If the access points are filtered out of the access point tiles, then the access points cannot be used by client device 110 to determine the current location of client device 110 when located at the sparse signal location. A sparse signal location can be a location where outside access point signals cannot be detected within the sparse signal location. For example, if external signals cannot enter the sparse signal location, client device 110 cannot use the (e.g., more frequently reported) external signals to determine the location of client device 110. Examples of sparse signal locations include transit stations (e.g., bus, train, light rail, etc.), especially underground stations, and business locations (e.g., corporate offices, storefronts, etc.) that receive limited traffic.

Figure 4:
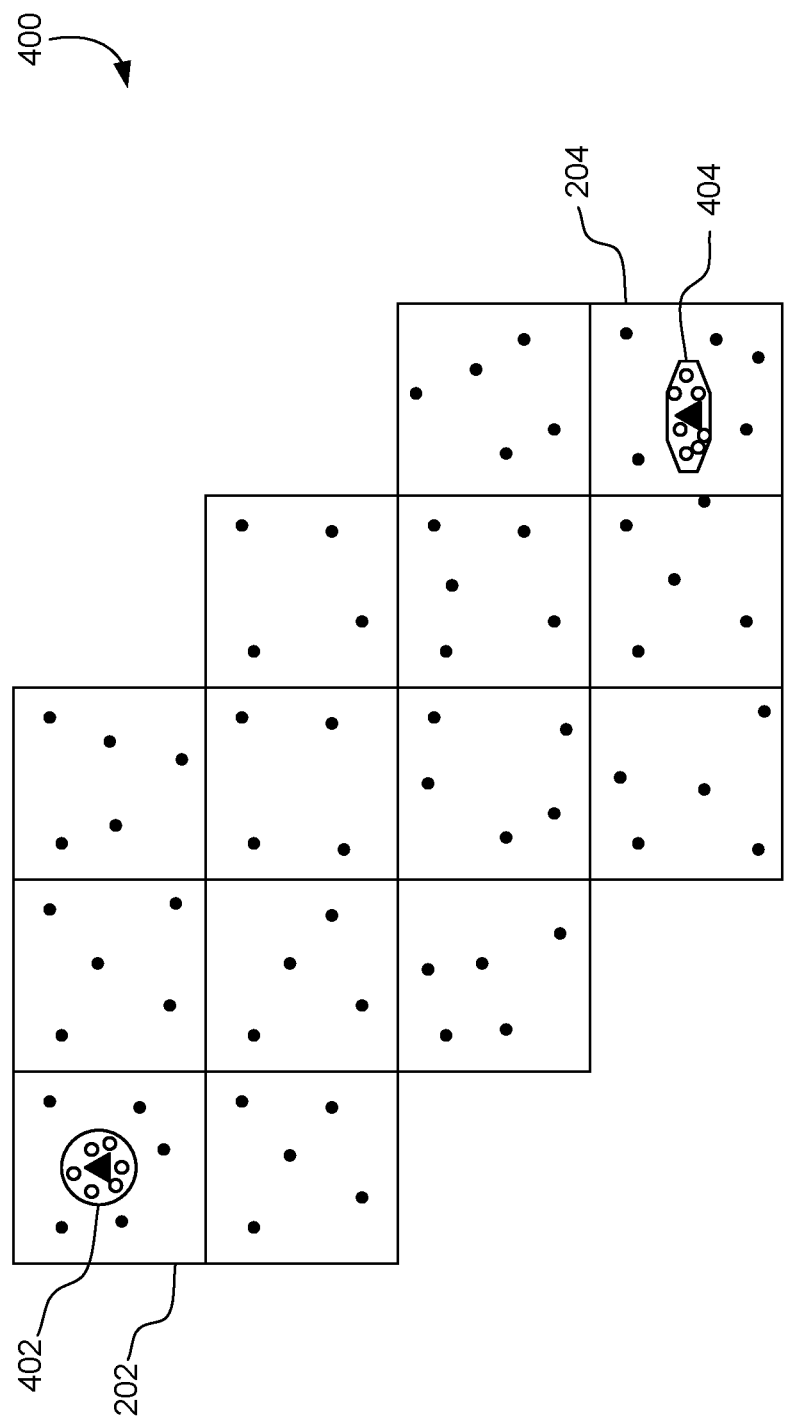
FIG. 4 illustrates an example geographic area having sparse signal locations augmented with Wi-Fi signal scan data.

FIG. 4 illustrates an example geographic area 400 having sparse signal locations augmented with Wi-Fi signal scan data. For example, geographic area 400 can correspond to area 200 of FIG. 2 and/or area 300 of FIG. 3. In some implementations, server device 160 can be configured with sparse signal locations. For example, server device 160 can store a database 170 that identifies the locations of sparse signal locations, such as train stations, subways, bus stations, office parks, store fronts, and/or other sparse signal locations.

In some implementations, after access point tile generator 168 generates access point tiles, access point tile injector 172 can insert additional Wi-Fi access point scan data at locations near the sparse signal locations identified in database 170. For example, access point tile injector 172 can insert Wi-Fi access point scan data within a radius distance around a sparse signal location. Access point tile injector 172 can determine the location of the sparse signal location (e.g., sparse signal location 302) based on the data in sparse signal location database 170. Access point tile injector 172 can determine an area 402 defined by a radius (e.g., 100 feet, 50 yards, etc.) around the sparse signal location. Access point tile injector 172 can obtain from Wi-Fi scan database 162 additional Wi-Fi scan data that identifies access points (e.g., empty circles in FIG. 4) that were detected by client devices at locations within the determined area 402. For example, the locations corresponding to the additional Wi-Fi access point scan data (e.g., empty circles) may not be the actual locations of the access points but, rather, the locations of client devices when the client devices detected the access point signals. In contrast, the access point location data (e.g., black dots) can define the determined locations of access points within each tile. Access point tile injector 172 can identify access point tiles that include the locations corresponding to the additional Wi-Fi access point scan data. Access point tile injector 172 can add the additional Wi-Fi scan data to the identified access point tiles so that the identified access point tiles have additional Wi-Fi access point information available for determining client device locations when client devices are located at sparse signal locations.

Similarly, Wi-Fi access point scan data can be inserted within a polygon that defines the perimeter of the sparse signal location (e.g., sparse signal location 302). The polygon shape can be determined based on the shape of the building, transit location, etc., that corresponds to the sparse signal location, for example. The polygon shape can define an area 404 within which Wi-Fi access point scan data should be inserted by access point tile injector 172, as described above. For example, access point tile injector 172 can obtain additional Wi-Fi access point scan data from Wi-Fi scan database 162 that includes Wi-Fi access points that were detected at locations within the polygon area 404. Access point tile injector 172 can insert the additional Wi-Fi access point scan data into access point tiles that include the locations where the corresponding Wi-Fi access point signals were detected.

In some implementations, after access point tile injector 172 augments the sparse signal locations within the corresponding access point tiles with the additional Wi-Fi scan data, server device 160 can transmit the access point tiles to client device 110. Client device 110 can store the access point tiles in access point tile database 122. Client device 110 can use the access point location data, including access point scan data inserted for the sparse signal locations, to determine the current location of client device 110 based on the Wi-Fi access point signals detected by client device 110. For example, client device 110 can scan for access point signals at its current unknown location. Once client device 110 detects access point signals and identifies the corresponding access points, client device 110 can compare the access point identifiers to the access points stored in access point tile database 122 to determine locations associated with the access point identifiers. Once the locations are determined, client device 110 can use the access point locations (e.g., actual locations or detected locations) to estimate the current location of client device 110 using known methods (e.g., trilateration, Wi-Fi fingerprinting, etc.).

Example Processes

Although the steps of the example processes below are presented in a particular order for clarity, individual steps of the described processes may be rearranged, omitted, and/or performed in a different order than that described below.

Figure 5:
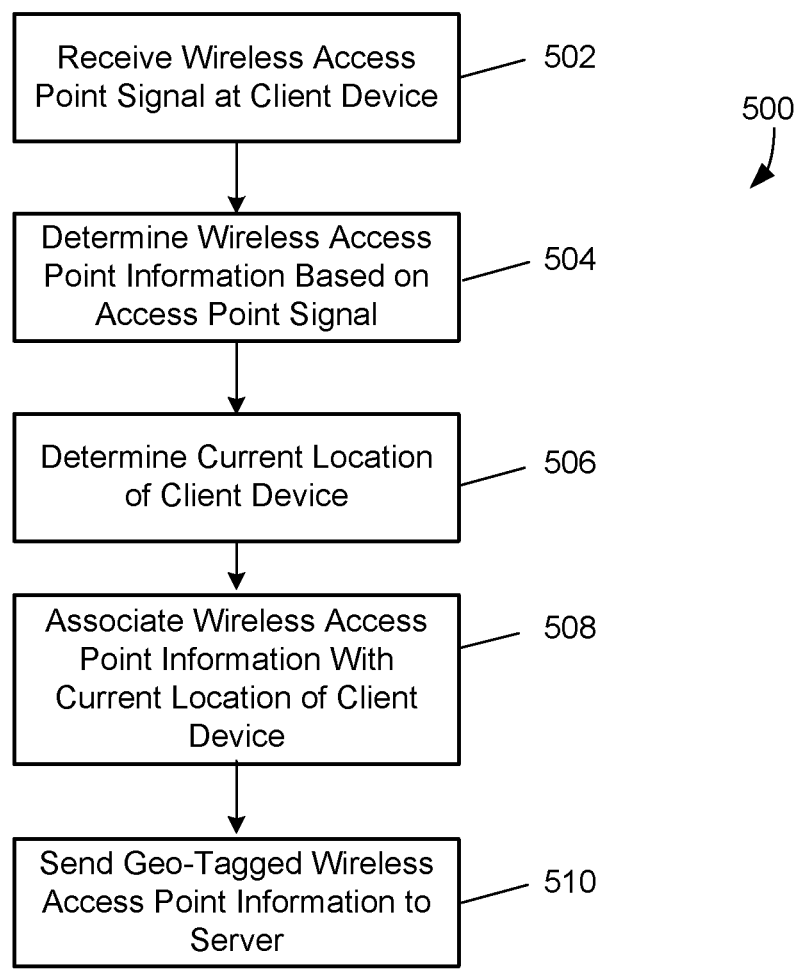
FIG. 5 is flow diagram of an example client process for reporting Wi-Fi access point scan data.

FIG. 5 is flow diagram of an example client process 500 for reporting Wi-Fi access point scan data. For example, multiple client devices (e.g., client devices 110) can collect and report Wi-Fi access point scan data to one or more access point location server devices (e.g., server device 160) according to process 500.

At step 502, a client device can receive wireless access point signals. For example, client device 110 can scan various Wi-Fi frequencies and/or channels to detect Wi-Fi signals from nearby access points.

At step 504, the client device can determine wireless access point information based on a detected access point signal. For example, once client device 110 detects a Wi-Fi access point signal, client device 110 can extract Wi-Fi access point information from the signal, such as an access point identifier and a signal transmission timestamp that indicates when the signal was transmitted by the sending access point. Client device 110 can generate other information for the Wi-Fi access point based on the signal, such as the Wi-Fi channel used to broadcast the signal, a timestamp indicating when client device 110 received the signal, and/or a received signal strength (RSS) for the Wi-Fi access point signal.

At step 506, the client device can determine the current location of the client device. For example, client device 110 can determine the current location of the client device based on satellite signals, cellular transmitter signals, and/or Wi-Fi access point signals, as described above.

At step 508, the client device can associate the wireless access point information determined at step 504 with the current location of the client device. For example, client device 110 can geo-tag the wireless access point information by associating the Wi-Fi access point identifier, the Wi-Fi access point information, and the current location of client device 110. Client device 110 can store the geotagged Wi-Fi access point information in Wi-Fi scan database 120, for example.

At step 510, the client device can send the geotagged wireless access point information to an access point location server device. For example, client device 110 can periodically (e.g., once a day) send the geotagged Wi-Fi access point information stored in Wi-Fi scan database 120 to server device 160. Client device 110 can send the geotagged Wi-Fi access point information in response to a triggering event, such as establishing a Wi-Fi connection, storing a maximum number of access point records in the Wi-Fi scan database, etc.

Figure 6:
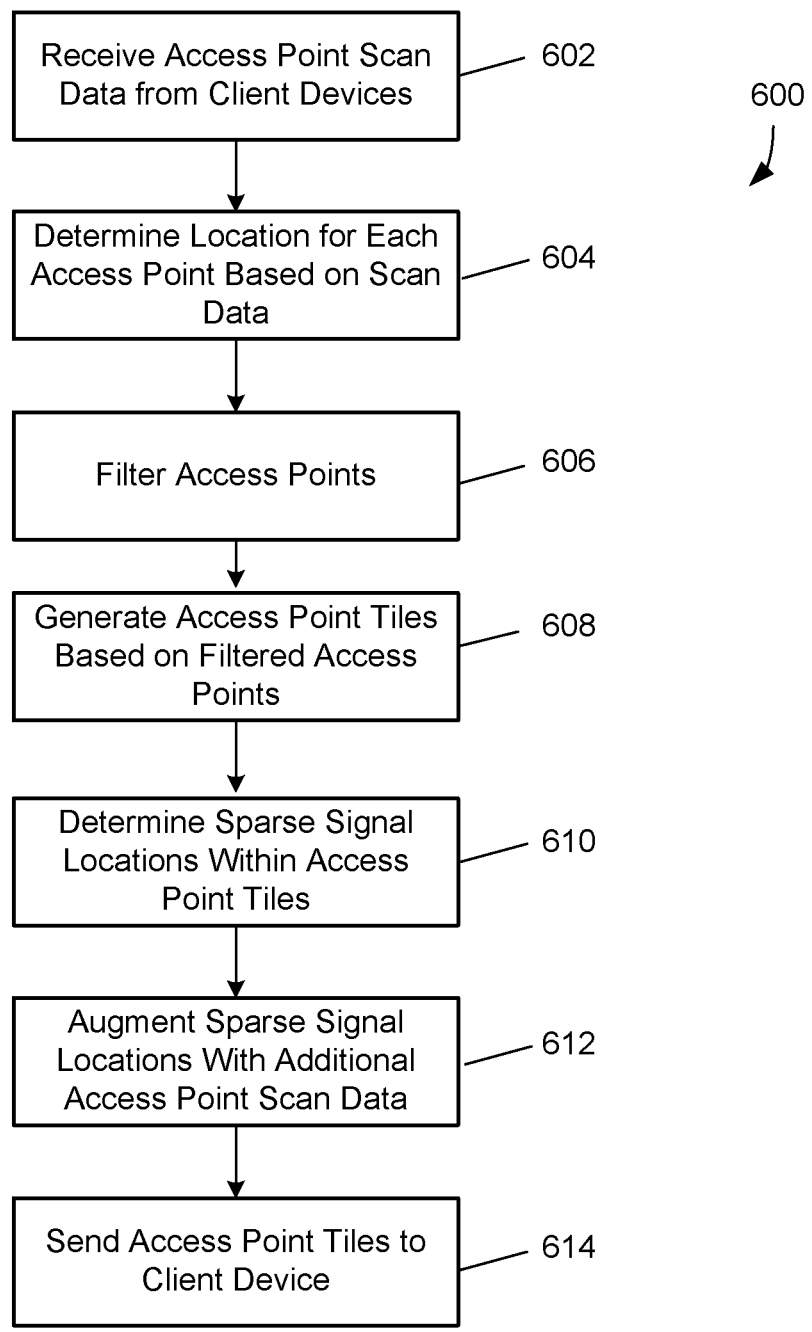
FIG. 6 is a flow diagram of an example server process for augmenting sparse signal locations in access point tiles with Wi-Fi scan data.

FIG. 6 is a flow diagram of an example server process 600 for augmenting sparse signal locations in access point tiles with Wi-Fi scan data. For example, when generating access point location tiles, access point location server 160 may reduce the amount of access point location data associated with each tile by filtering out access point location data. After filtering, there may be locations (e.g., sparse signal locations) within a tile that do not have enough Wi-Fi location data for a client device to determine its current location based on Wi-Fi signals. The server device can insert additional Wi-Fi scan data into these locations (e.g., into corresponding access point tiles) to allow the client device to estimate its current location based on the available (e.g., detectable) Wi-Fi access point signals.

At step 602, a server device can receive wireless access point scan data from client devices. For example, the access point scan data can include a Wi-Fi access point identifier, transmission timestamp, received timestamp, distance value indicating the calculated distance between the receiving client device and the transmitting access point, Wi-Fi channel upon which the signal was received, received signal strength of the Wi-Fi signal, and/or the geographic location where the client detected the Wi-Fi access point signal. Upon receipt of the Wi-Fi access point scan data, server device 160 can store the Wi-Fi access point scan data in Wi-Fi scan database 162.

At step 604, the server device can determine the location for each access point based on the received Wi-Fi scan data. For example, server device 160 can estimate the location of each Wi-Fi access point reported by the client devices in the Wi-Fi scan data based on the location of the client device when the client device received the Wi-Fi access point signal and the calculated distance between the client device and the Wi-Fi access point. For example, server device 160 can perform a trilateration calculation using the client device locations and distances to estimate the access point locations.

Once the access point locations are determined, server device 160 can store the access point location information in access point location database 166. In some implementations, server device 160 can store other access point information with the access point location data in access point location database 166. For example, based on the Wi-Fi access point scan data, server device 160 can calculate a frequency of detection for each access point. Based on the Wi-Fi access point scan data, server device 160 can determine how recently a Wi-Fi access point was last detected. Based on the Wi-Fi access point scan data, server device 160 can determine average signal strength for a Wi-Fi access point. Server device 160 can store these access point metrics and/or the access point scan data with the estimated location of the access point in access point location database 166.

At step 606, the server device can filter the access point location data. In some implementations, server device 160 can reduce the amount of data associated with an access point tile by filtering out less significant access points and retaining the most significant (e.g., most useful) access point location data in the access point tile. For example, server device 160 can filter access points based on frequency of detection. Access points that do not have a detection frequency that exceeds a threshold frequency can be filtered out of the access point location data. Server device 160 can filter access points based on how recently the access point was last detected. Access points that have not been detected in a threshold period of time (e.g., a day, a week, etc.) can be filtered out of the access point location data. Server device 160 can filter access points based on geographic location. For example, server device 160 can filter access points so that the access points provide coverage of a geographic area (e.g., access point tile).

At step 608, the server device can generate access point tiles based on the filtered access point location data. For example, tiles are a mechanism by which a large amount of Wi-Fi access point data corresponding to a large geographic area (e.g., the world, a country, a region, a city, etc.) can be divided into a smaller amount of data corresponding to smaller geographic areas. Because the access point tiles have less data, the access point tiles require less bandwidth to send to client devices and require less storage at the client devices.

Server device 160 can determine which of the access points in the filtered access point location data are located within an access point tile and associate the corresponding access point data with the access point tile. For example, an access point tile can represent a geographic area. The access point tile can be associated with a collection data structure (e.g., a bin, array, map, etc.). Server device 160 can store the access point location data for access points that fall within the geographic area covered by the access point tile in the collection data structure. The access point tile data structure can be delivered to a client device when the client device is near (e.g., within a mile, within 100 miles, etc.) the access point tile. Thus, instead of delivering a large amount of access point location data (e.g., corresponding to the world, a continent, etc.), server device 160 can deliver a small amount of access point data, as needed, to client devices thereby reducing the bandwidth and storage requirements imposed on client devices.

At step 610, the server device can determine sparse signal locations within the generated access point tiles. For example, server device 160 can obtain data identifying sparse signal locations from sparse signal location database 170. The obtained sparse signal location data can identify a specific location for the sparse signal location. The obtained sparse signal location data can identify an area that defines the sparse signal location. The sparse signal location area can be defined in the sparse signal location data as a polygon surrounding the sparse signal location, for example. The sparse signal location area can be defined in the sparse signal location data by a radius distances from the sparse signal location. For example, the radius distance can be used by server device 160 to define a circular area surrounding the sparse signal location. In some implementations, server device 160 can be configured with a default radius distance. For example, server device 160 can use the default radius distance to define an area around a sparse signal location.

At step 612, the server device can augment the sparse signal locations with additional access point scan data. For example, server device 160 can identify additional Wi-Fi access point scan data in Wi-Fi scan database 162 that was detected by client devices at locations within the sparse signal location area determined at step 614. Server device 160 can identify access point tiles that include locations corresponding to the additional Wi-Fi access point scan data and insert the Wi-Fi access point scan data into the identified access point tiles.

At step 614, the server device can send the access point tiles to client devices. For example, server device 160 can send the access point tiles, including the augmented access point tiles, to client device 110 so that client device 110 can use the Wi-Fi access point information contained within the tiles to determine a current location of client device 110 based on Wi-Fi access point signals received by client device 110.

Figure 7:
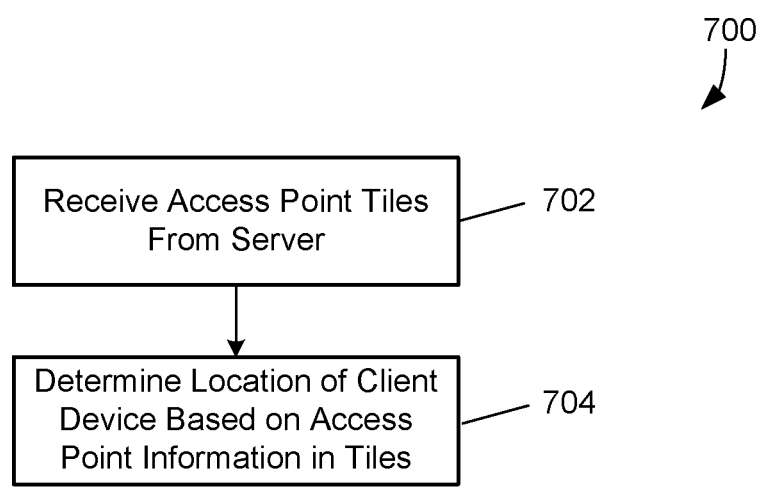
FIG. 7 is a flow diagram of an example client process for determining the current location of a client device based on augmented sparse signal locations.

FIG. 7 is a flow diagram of an example client process 700 for determining the current location of a client device based on augmented sparse signal locations. For example, because access point tiles contain filtered Wi-Fi access point data, the access point tiles may not include the Wi-Fi access point data necessary for determining the current location of a client device when the client device is located in a sparse signal location. By augmenting sparse signal locations in access point tiles with additional Wi-Fi access point data, client devices have a better chance of estimating the current location of the client device based on the limited signal information in the sparse signal location.

At step 702, a client device can receive access point tiles from an access point location server device. For example, client device 110 can send a request for access point tiles to the access point location server 160. The client request can include the current location of client device 110. Server 160 can identify which access point tiles are within a threshold distance (e.g., 1 mile, 10 miles, 500 miles, etc.) of the location of client device 110 and send the identified access point tiles to client device 110. For example, for each identified tile, server device 160 can send a collection of access points associated with (e.g., located within) the access point tile. Once the access point tiles area received from server 160, client device 110 can store the access point tiles in access point tile database 122, for example.

At step 704, the client device can determine the current location of the client device based on the access point information in the access point tiles. For example, client device 110 can receive Wi-Fi access point signals from multiple Wi-Fi access points. Client device 110 can determine access point identifiers for the access points transmitting the detected access point signals based on data encoded in the signals. Client device 110 can determine the locations of the transmitting access points by comparing the access point identifiers to access point location data in access point location database 166. Client device 110 can calculate the distance between client device 110 and each access point based on the time of flight for each received access point signal, as described above. Client device 110 can perform a trilateration calculation based on the known location of each Wi-Fi access point and the distance between client device 110 and the Wi-Fi access point to estimate the current location of client device 110.

In some implementations, client device 110 can perform Wi-Fi fingerprint matching to estimate the current location of client device 110. For example, client device 110 can generate a Wi-Fi fingerprint for the unknown current location of client device 110 based on the received access point signals. For example, client device 110 can determine an access point identifier for each received signal and the received signal strength for each signal. Client device 110 can generate a Wi-Fi fingerprint based on the access point identifiers and signal strength information. For example, the signal strength of each Wi-Fi signal can vary based on the location of client device 110. Thus, a grouping of access points and signal strengths can be used to generate a Wi-Fi fingerprint that is unique to a particular location. Client device 110 can compare the Wi-Fi fingerprint to the Wi-Fi access point data (e.g., access point identifiers, Wi-Fi access point signal strength information, etc.) in access point tile database 122 to identify a location having a grouping of Wi-Fi access point identifiers and signal strengths that are similar to the generated Wi-Fi fingerprint. Client device 110 can estimate the current location of client device 110 based on the identified location.

Example Computer System Architecture

Figure 8:
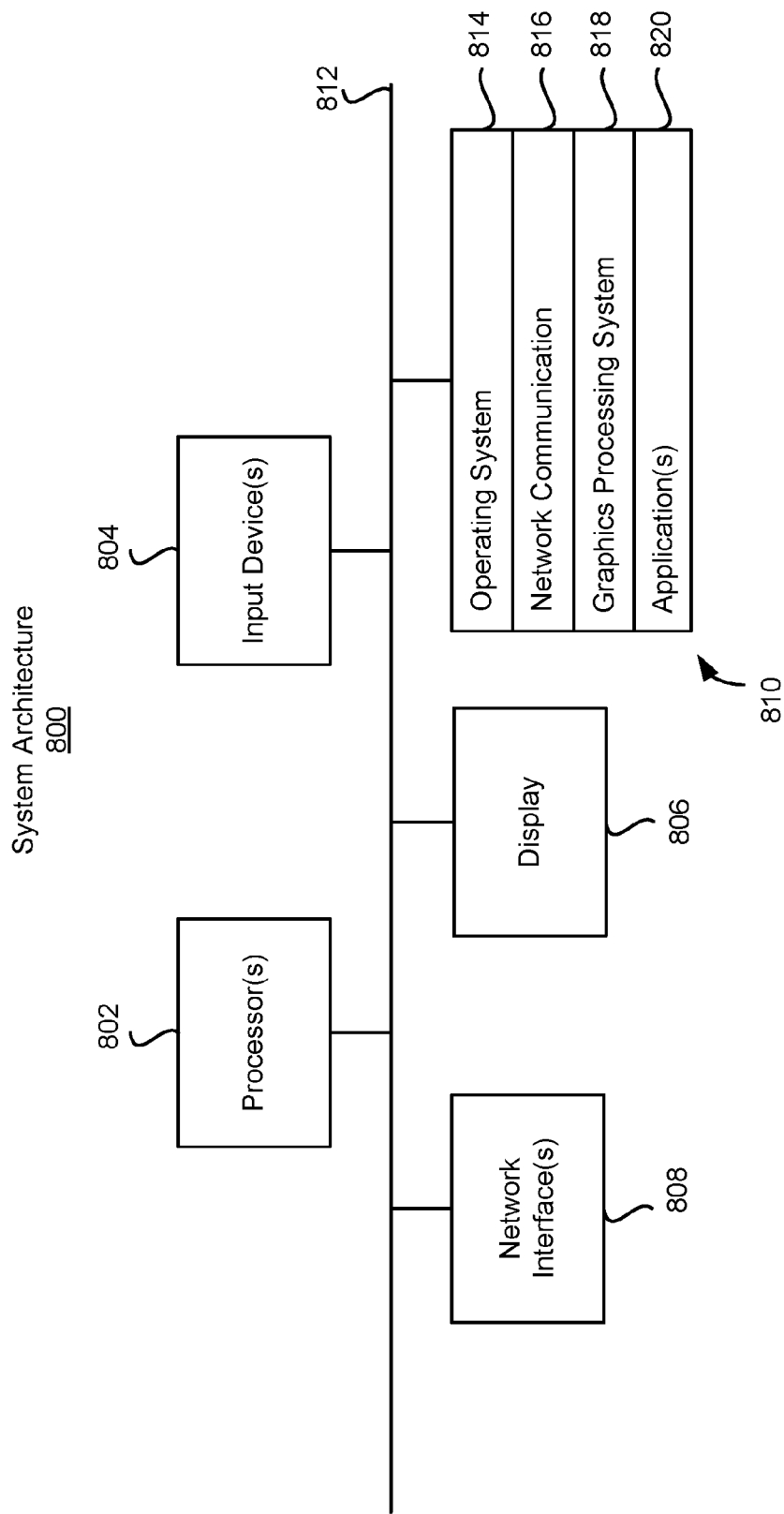
FIG. 8 is a block diagram of an example system architecture.

FIG. 8 is a block diagram of an example system architecture for implementing the features and processes of FIGS. 1-7. The architecture 800 can be implemented on any electronic device that runs software applications derived from compiled instructions, including without limitation personal computers, servers, smart phones, media players, electronic tablets, game consoles, email devices, etc. In some implementations, the architecture 800 can include one or more processors 802, one or more input devices 804, one or more display devices 806, one or more network interfaces 808 and one or more computer-readable mediums 810. Each of these components can be coupled by bus 812.

Display device 806 can be any known display technology, including but not limited to display devices using Liquid Crystal Display (LCD) or Light Emitting Diode (LED) technology. Processor(s) 802 can use any known processor technology, including but are not limited to graphics processors and multi-core processors. Input device 804 can be any known input device technology, including but not limited to a keyboard (including a virtual keyboard), mouse, track ball, and touch-sensitive pad or display. Bus 812 can be any known internal or external bus technology, including but not limited to ISA, EISA, PCI, PCI Express, NuBus, USB, Serial ATA or FireWire. Computer-readable medium 810 can be any medium that participates in providing instructions to processor(s) 802 for execution, including without limitation, non-volatile storage media (e.g., optical disks, magnetic disks, flash drives, etc.) or volatile media (e.g., SDRAM, ROM, etc.).

Computer-readable medium 810 can include various instructions 814 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 804; sending output to display device 806; keeping track of files and directories on computer-readable medium 810; controlling peripheral devices (e.g., disk drives, printers, etc.) which can be controlled directly or through an I/O controller; and managing traffic on bus 812. Network communications instructions 816 can establish and maintain network connections (e.g., software for implementing communication protocols, such as TCP/IP, HTTP, Ethernet, etc.).

A graphics processing system 818 can include instructions that provide graphics and image processing capabilities. For example, the graphics processing system 818 can implement the processes described with reference to FIGS. 1-7. Application(s) 820 can be an application that uses or implements the processes described in reference to FIGS. 1-7. The processes can also be implemented in operating system 814.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

Example Mobile System Architecture

Figure 9:
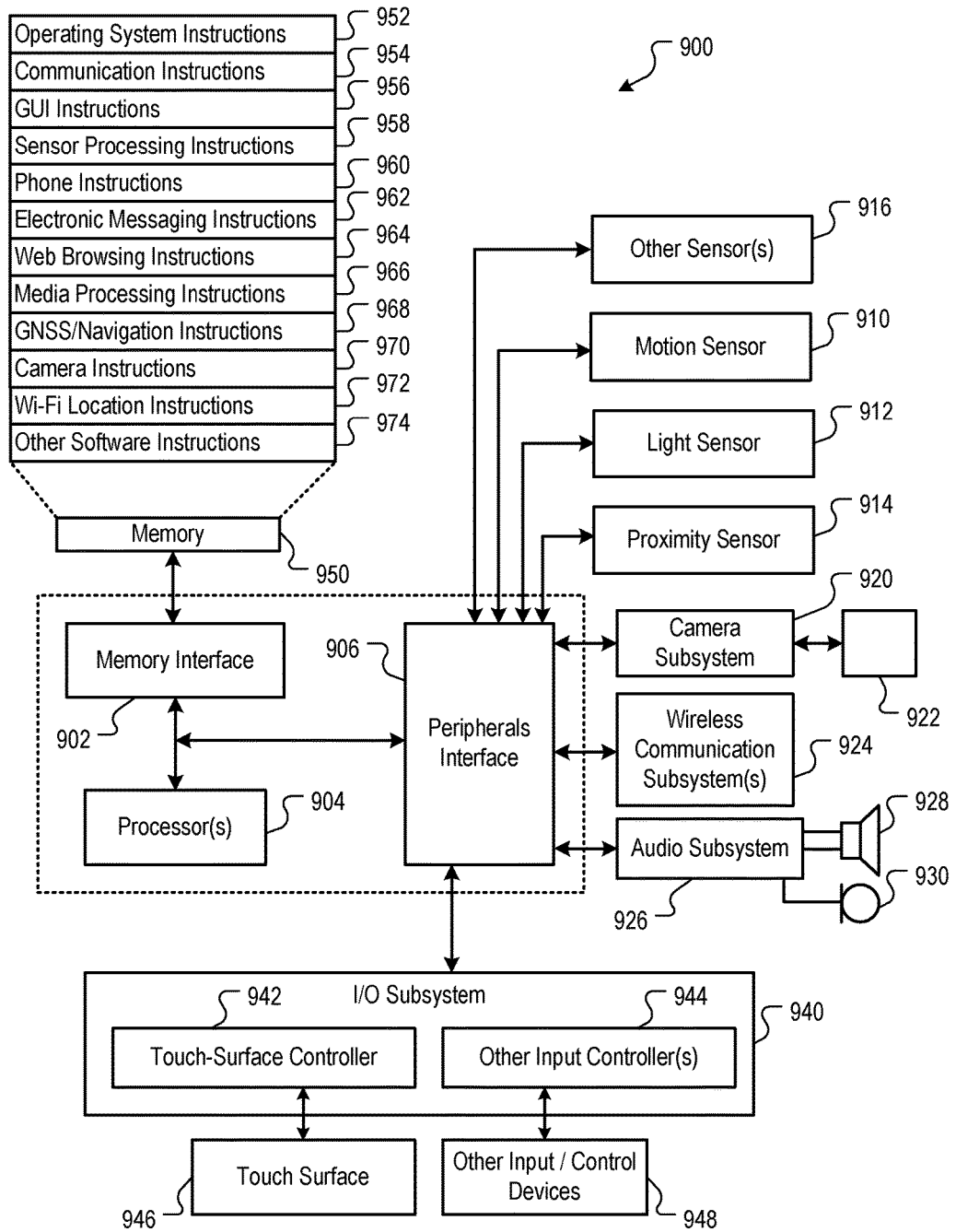
FIG. 9 is a block diagram of an example mobile computing device.

FIG. 9 is a block diagram of an example mobile computing device 900 for implementing the features and processes of FIGS. 1-7. The computing device 900 can include a memory interface 902, one or more data processors, image processors and/or central processing units 904, and a peripherals interface 906. The memory interface 902, the one or more processors 904 and/or the peripherals interface 906 can be separate components or can be integrated in one or more integrated circuits. The various components in the computing device 900 can be coupled by one or more communication buses or signal lines.

Sensors, devices, and subsystems can be coupled to the peripherals interface 906 to facilitate multiple functionalities. For example, a motion sensor 910, a light sensor 912, and a proximity sensor 914 can be coupled to the peripherals interface 906 to facilitate orientation, lighting, and proximity functions. Other sensors 916 can also be connected to the peripherals interface 906, such as a global navigation satellite system (GNSS) (e.g., GPS receiver), a temperature sensor, a biometric sensor, magnetometer or other sensing device, to facilitate related functionalities.

A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips. The camera subsystem 920 and the optical sensor 922 can be used to collect images of a user to be used during authentication of a user, e.g., by performing facial recognition analysis.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which the computing device 900 is intended to operate. For example, the computing device 900 can include communication subsystems 924 designed to operate over a GSM network, a GPRS network, an EDGE network, a Wi-Fi or WiMax network, and a Bluetooth™ network. In particular, the wireless communication subsystems 924 can include hosting protocols such that the device 100 can be configured as a base station for other wireless devices.

An audio subsystem 926 can be coupled to a speaker 928 and a microphone 930 to facilitate voice-enabled functions, such as speaker recognition, voice replication, digital recording, and telephony functions. The audio subsystem 926 can be configured to facilitate processing voice commands, voiceprinting and voice authentication, for example.

The I/O subsystem 940 can include a touch-surface controller 942 and/or other input controller(s) 944. The touch-surface controller 942 can be coupled to a touch surface 946. The touch surface 946 and touch-surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 946.

The other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of the speaker 928 and/or the microphone 930.

In one implementation, a pressing of the button for a first duration can disengage a lock of the touch surface 946; and a pressing of the button for a second duration that is longer than the first duration can turn power to the computing device 900 on or off. Pressing the button for a third duration can activate a voice control, or voice command, module that enables the user to speak commands into the microphone 930 to cause the device to execute the spoken command. The user can customize a functionality of one or more of the buttons. The touch surface 946 can, for example, also be used to implement virtual or soft buttons and/or a keyboard.

In some implementations, the computing device 900 can present recorded audio and/or video files, such as MP3, AAC, and MPEG files. In some implementations, the computing device 900 can include the functionality of an MP3 player, such as an iPod™. The computing device 900 can, therefore, include a 36-pin connector that is compatible with the iPod. Other input/output and control devices can also be used.

The memory interface 902 can be coupled to memory 950. The memory 950 can include high-speed random access memory and/or non-volatile memory, such as one or more magnetic disk storage devices, one or more optical storage devices, and/or flash memory (e.g., NAND, NOR). The memory 950 can store an operating system 952, such as Darwin, RTXC, LINUX, UNIX, OS X, WINDOWS, or an embedded operating system such as VxWorks.

The operating system 952 can include instructions for handling basic system services and for performing hardware dependent tasks. In some implementations, the operating system 952 can be a kernel (e.g., UNIX kernel). In some implementations, the operating system 952 can include instructions for performing voice authentication. For example, operating system 952 can implement the Wi-Fi based location determination features as described with reference to FIGS. 1-7.

The memory 950 can also store communication instructions 954 to facilitate communicating with one or more additional devices, one or more computers and/or one or more servers. The memory 950 can include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GNSS/Navigation instructions 968 to facilitate GNSS and navigation-related processes and instructions; and/or camera instructions 970 to facilitate camera-related processes and functions.

The memory 950 can store Wi-Fi location instructions 972 to facilitate other processes and functions, such as the Wi-Fi based location determination processes and functions as described with reference to FIGS. 1-7.

The memory 950 can also store other software instructions 974, such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions of the computing device 900 can be implemented in hardware and/or in software, including in one or more signal processing and/or application specific integrated circuits.

What is claimed is:

1. A method comprising:
   receiving, at a server device, wireless access point scan data from a plurality of client devices over a wireless network connection;
   generating, by the server device, access point tiles based on the wireless access point scan data received from the plurality of client devices;
   obtaining, by the server device, sparse signal location data that identifies a sparse signal location;
   obtaining, by the server device, additional access point scan data associated with wireless access points that were detected within a sparse signal location area surrounding the sparse signal location;
   identifying, by the server device, an access point tile corresponding to the sparse signal location area;
   inserting, by the server device, the additional access point scan data into the access point tile; and
   transmitting the access point tile over the wireless network connection to at least one of the client devices when it is determined that the at least one client device is within a predetermined distance of the access point tile, the transmitted access point tile allowing the at least one client device to determine a current location of the at least one client device based on received access signals.

2. The method of claim 1, wherein the sparse signal location area corresponds to a circular area defined by a radius distance from the sparse signal location.

3. The method of claim 1, wherein the access point tile corresponds to a geographic area and includes access point location data identifying estimated locations for access points within the geographic area.

4. The method of claim 1, wherein the access point tile corresponds to a geographic area and includes access point location data identifying locations within the geographic area where access points were detected by one or more client devices.

5. The method of claim 1, wherein generating access point tiles based on wireless access point scan data received from a plurality of client devices comprises filtering the access point scan data to remove a least significant wireless access point scan data.

6. The method of claim 1, wherein identifying an access point tile corresponding to the sparse signal location area comprises identifying an access point tile corresponding to a wireless access point detection location within the sparse signal location area.

7. A system comprising:
   one or more processors; and
   a non-transitory computer-readable medium including one or more sequences of instructions which, when executed by the one or more processors, causes:
      receiving, by the one or more processors, wireless access point scan data from a plurality of client devices over a wireless network connection;
      generating access point tiles based on wireless access point scan data received from the plurality of client devices;
      obtaining sparse signal location data that identifies a sparse signal location;
      obtaining additional access point scan data associated with wireless access points that were detected within a sparse signal location area surrounding the sparse signal location;
      identifying an access point tile corresponding to the sparse signal location area;

inserting the additional access point scan data into the access point tile; and transmitting the access point tile over the wireless network connection to at least one of the client devices when it is determined that the at least one client device is within a predetermined distance of the access point tile, the transmitted access point tile allowing the at least one client device to determine a current location of the at least one client device based on received access signals.

8. The system of claim 7, wherein the sparse signal location area corresponds to a circular area defined by a radius distance from the sparse signal location.

9. The system of claim 7, wherein the access point tile corresponds to a geographic area and includes access point location data identifying estimated locations for access points within the geographic area.

10. The system of claim 7, wherein the access point tile corresponds to a geographic area and includes access point location data identifying locations within the geographic area where access points were detected by one or more client devices.

11. The system of claim 7, wherein the instructions that cause generating access point tiles based on wireless access point scan data received from a plurality of client devices include instructions that cause filtering the access point scan data to remove a least significant wireless access point scan data.

12. The system of claim 7, wherein the instructions that cause identifying an access point tile corresponding to the sparse signal location area include instructions that cause identifying an access point tile corresponding to a wireless access point detection location within the sparse signal location area.

13. A non-transitory computer-readable medium including one or more sequences of instructions which, when executed by one or more processors, causes:

receiving, by the one or more processors, wireless access point scan data from a plurality of client devices over a wireless network connection;

generating access point tiles based on wireless access point scan data received from the plurality of client devices;

obtaining sparse signal location data that identifies a sparse signal location;

obtaining additional access point scan data associated with wireless access points that were detected within a sparse signal location area surrounding the sparse signal location;

identifying an access point tile corresponding to the sparse signal location area;

inserting the additional access point scan data into the access point tile; and transmitting the access point tile over the wireless network connection to at least one of the client devices when it is determined that the at least one client device is within a predetermined distance of the access point tile, the transmitted access point tile allowing the at least one client device to determine a current location of the at least one client device based on received access signals.

14. The non-transitory computer-readable medium of claim 13, wherein the sparse signal location area corresponds to a circular area defined by a radius distance from the sparse signal location.

15. The non-transitory computer-readable medium of claim 13, wherein the access point tile corresponds to a geographic area and includes access point location data identifying estimated locations for access points within the geographic area.

16. The non-transitory computer-readable medium of claim 13, wherein the access point tile corresponds to a geographic area and includes access point location data identifying locations within the geographic area where access points were detected by one or more client devices.

17. The non-transitory computer-readable medium of claim 13, wherein the instructions that cause generating access point tiles based on wireless access point scan data received from a plurality of client devices include instructions that cause filtering the access point scan data to remove a least significant wireless access point scan data.

18. The non-transitory computer-readable medium of claim 13, wherein the instructions that cause identifying an access point tile corresponding to the sparse signal location area include instructions that cause identifying an access point tile corresponding to a wireless access point detection location within the sparse signal location area.

* * * * *